United States Patent [19]

Watson, Jr. et al.

[11] Patent Number: 4,816,494
[45] Date of Patent: Mar. 28, 1989

[54] ENHANCED HOMOGENEOUS POLYURETHANE FOAM COMFORT CUSHIONING AND PROCESS FOR MAKING SAME

[75] Inventors: Stuart L. Watson, Jr., Midlothian; Paul H. Hostler, Richmond; David L. Haley, Chester, all of Va.

[73] Assignee: E. R. Carpenter Company, Inc., Richmond, Va.

[21] Appl. No.: 158,475

[22] Filed: Feb. 22, 1988

[51] Int. Cl.$^4$ .............................................. C08G 18/14
[52] U.S. Cl. .................................................... 521/137
[58] Field of Search ......................................... 521/137

[56] References Cited

U.S. PATENT DOCUMENTS 4,725,627  2/1988  Amason et al. ..................... 521/137

Primary Examiner—Maurice J. Welsh
Attorney, Agent, or Firm—Beveridge, DeGrandi & Weilacher

[57] ABSTRACT

Preparing a flexible, polyurethane foam:
 (a) placing a polyol polyurethane foam-forming reaction mixture in a reaction zone and allowing the mixture to rise, thereby forming a partially cured cellular material,
 (b) applying a compressive force to the partially cured cellular material after the elapsing of a period of time after completion of the rise to thereby reduce the volume of the partially cured cellular material, and
 (c) removing the compressive force and completing the cure of the compressed cellular material.

The cellular material has enhanced cushioning properties including a unique and superior feeling of comfort resulting from a soft touch yet with a deep firm support with an appropriate springiness to the foam. The polyol in the polyurethane foam-forming reaction mixture contains a mixture of
 (d) from 90–10 parts by weight of a polymer-polyol composition containing about 10–40% polymer solids, and
 (e) from 10–90 parts by weight of a base polyol having a molecular weight of at least 4500 up to 7000.

The cellular material has a final volume which is reduced by about 10–60% of the original volume of the partially cured cellular material after the compressive force is removed based on the weight of the polyol components cellular material has a Support Factor of from about 2–5.

14 Claims, No Drawings

ENHANCED HOMOGENEOUS POLYURETHANE FOAM COMFORT CUSHIONING AND PROCESS FOR MAKING SAME

This invention relates to an improved homogeneous polyurethane foam cushioning material having enhanced cushioning properties and which provides a soft touch or feel when a person sits thereon, followed by a significant firm support as the weight of the person is applied, which feel and support is not found in present day polyurethane foam cushions. This invention also relates to a improved process for making such comfort cushioning foam.

BACKGROUND OF THE INVENTION

The dominant material used commercially for comfort cushioning, such as furniture cushions, automotive cushions, mattresses, carpet underlays, etc., is polyurethane foam. Such foam is prepared by the reaction of a multifunctional polyester or polyether polyol with a polyfunctional isocyanate in the presence of water and often a blowing agent. This low density cellular material is both economical to manufacture as well as versatile in fabrication capability to allow formation of different shapes and sizes of foam.

Two key attributes of a comfort cushioning material are, first, a soft initial touch or feel followed by, second, a significant support or load bearing upon further penetration into the foam as the person's weight is applied thereto by sitting or lying thereon. This character of a foam is termed the Support Factor and is numerically defined as the ratio of load bearing capability at 65% deflection to the load bearing capability at 25% deflection. As determined by ASTMD-3574, the Support Factor is the ratio of 65% Indentation Force Deflection to 25% Indentation Force Deflection.

Prior to the present invention the available polyurethane foam materials, at a reasonable commercial density, had a Support Factor in the range of about 1.8–2.6. While this fairly narrow range sufficed for many cushioning needs, a large segment of the market requires a much larger Support Factor in such materials.

Prior to the present invention, larger Support Factor materials were attained by any of several time consuming and expensive procedures. In one such procedure two foams, each differing in degree of firmness or hardness, were adhesively laminated to form a composite which had a soft initial feel followed by deep support provided primarily by the firmer foam. In an extreme case, the softer foam of the laminate was a convoluted foam which yielded an extreme initial softness. Another common method of providing a cushion having a soft initial touch upon being seated followed by deep support has been to adhesively laminate a bonded, nonwoven, synthetic fiber composition to the surface of the cushioning material. This soft nonwoven foam composite provides a soft space filling along with a firm support, which support is dependent on the polyurethane foam which is utilized.

These methods of providing a broad range of support factor involve expensive multi-step operations and, very often, a plurality of materials, such as nonwoven fibers, adhesives, and the like.

Flexible, densified foams are also known in the art and their use as rug padding, cushions, mattresses, etc. has been suggested. U.S Pat. Nos. 3,506,600 and 3,709,843 disclose a process for preparing a flexible, densified polyurethane foam having a density between about 1.5 to about 15 pounds per cubic foot. A polyurethane foam-forming reaction mixture is allowed to rise in a reaction zone to form a partially cured cellular material and then a compressive force is applied thereto within a period of from 0 to 10 minutes after the completion of the rise. The compressive force reduces the volume of the partially cured cellular material to between about ⅜ to about 1/10 of the original volume. The compressive force is removed and the curing of the compressed cellular material is then completed. The time between the completion of the rise and the application of the compressive force depends upon the environmental temperature of the partially cured cellular material.

The densified foams made by the process of U.S. Pat. No. 3,506,600 are alleged to have a Support or Sac Factor of between about 2–3 to about 10 and such foams allegedly have little tendency to "bottom-out". The term "bottom-out" or "bottoming-out" is stated to be employed in the cushioning trade to describe a foam in which there is a sensation of sinking through and hitting the bottom when someone sits on it.

U.S. Pat. No. 3,658,972 describes a process for making a flexible molded densified polyurethane foam having at least two integral sections of different densities and useful in making a molded bucket seat for automobiles, which process incorporates to a large extent the process of U.S. Pat. No. 3,506,600. U.S. Pat. No. 3,787,278 discloses a flexible, molded, densified polyurethane foam prepared from a single foam formulation and having at least two integral sections of different densities. U.S. Pat. No. 3,867,320 discloses a densified polyurethane foam which is flame retardant. U.S. Pat. No. 3,650,993 discloses a process for preparing a flexible densified polyurethane foam whereby the thickness of undensified polyurethane foam layers integral with the densified foam is reduced, which process utilizes particular foaming agents. U.S. Pat. No. 3,709,966 discloses a process for making a polyurethane foam composite having a plurality of bonded layers wherein at least one of the layers is a flexible, densified polyurethane foam.

Apparatus suitable for making densified foam is known and is disclosed in U.S. Pat. Nos. 4,134,945, 4,252,517, 4,338,072 and 4,344,902.

While densified polyurethane foams, as described in the above patents, have been known in the art, and their use as seat cushions, mattresses, bucket seats, rug underlays, etc. have been suggested, foams prepared using the teachings of these patents, when made into seat cushions, were found to yield an uncomfortable character despite their moderately large Support Factor. This uncomfortable character has been described as a dead feel with a lack of springiness.

OBJECTS OF THE INVENTION

Accordingly, it is a primary object of the present invention to provide a densified polyurethane foam having a large Support Factor and which provides enhanced comfort cushioning properties over the properties of presently known densified polyurethane foams.

A further object of this invention is to provide a process for the preparation of such a foam having enhanced comfort cushioning properties, which process utilizes a particular type of foam formulation and the Support Factor of the foam so produced can be controlled.

SUMMARY OF THE INVENTION

A densified polyurethane foam having unexpected enhanced cushioning properties over those of known densified polyurethane foams and suitable for use as furniture cushions, automotive cushions, mattresses, etc. and having a unique and superior feeling of comfort resulting from a soft touch yet with a deep firm support with an appropriate springiness to the foam is prepared from a formulation of (1) from 90–10 parts by weight of a polymer-polyol or graft-polyol composition, specifically, polymer- or graft-polyols containing about 10–40% polymer solids and (2) from 10–90 parts by weight of high molecular weight base polyols along with the attendant polyisocyanate, blowing agent, reaction catalysts, surfactant and possibly other additives, and is then subjected to a compression or densification force during the initial curing period of the polyurethane foam. The densified polyurethane foam of the invention has a Support Factor within the range of from about 2 to about 5. The molecular weight of the base polyols, is at least about 4500 and preferably within the range of 5000–7000. The enhanced comfort cushioning of the invention contains about 5 to about 20 percent polymer particles based upon the weight of the polyol components.

DETAILED DESCRIPTION OF THE INVENTION

In preparing the polyurethane foam formulation for the present invention, it is essential that the polyol portion of the formulation consists of a mixture of (1) from 90–10 parts by weight of a polymer- polyol or graft-polyol composition, specifically, polymer- or graft-polyols containing about 10–40% polymer solids, and (2) from 10–90 parts by weight of a high molecular weight base polyol, i.e., having a molecular weight of at least 4500 and preferably within the range of 5000–7000. In a preferred embodiment the polymerpolyol or graft-polyol composition is present in an amount of from about 70–30 parts by weight and the high molecular weight base polyol is present in an amount of from 30–70 parts by weight of the total polyol. In a more preferred embodiment the ratio is about 60–40 parts by weight of the polymer-polyol or graft-polyol composition to about 40–60 parts by weight of the aforementioned base polyol.

The base polyols are generally prepared by reacting an alkylene oxide, such as propylene oxide, ethylene oxide, butylene oxide, epichlorohydrin, etc. and mixtures thereof with a starter molecule such as a polyhydric alcohol as is well-known in the art. The reaction takes place in the presence of an alkaline catalyst, such as potassium hydroxide. Any polyhydric alcohol which is suitable for preparing polyether polyols useful in making flexible polyurethane foam may be employed including glycerol, trimethylolpropane, ethylene glycol, propylene glycol, 1,5- pentane diol, triethylolpropane, sorbitol, mixtures thereof and the like. For use in the formulation of the present invention, the molecular weight of the base polyol should be greater than 4500 and preferably within the range of about 5000 to about 7000 and having a plurality of primary hydroxyl end groups usually obtained by capping or tipping the polyol, which is made predominantly with propylene oxide, with ethylene oxide.

The polymer-polyols or graft-polyols utilized in the present invention may be of several types, including the vinyl-type, as described in U.S. Pat. Nos. 3,383,351 and 3,304,273, or the step-growth polymerization types, as described in U.S. Pat. Nos. 4,374,209 and 3,325,421, the disclosures of all of which are incorporated herein by reference.

U.S. Pat. No. 3,383,351, discloses polymer-polyols or graft-polyols and the method for forming such polyols for use in polyurethane-forming reactions so as to introduce into the resultant polyurethane both the polyol and the dispersed polymer. A reactive, stable dispersion is prepared by the in-situ polymerization on an ethylenically unsaturated monomer in a reactive polyol solvent medium to produce a dispersed polymer containing reactive radicals. As described in the patent, the polymer-polyol is formed by first dispersing a minor amount of ethylenically unsaturated monomer in a major amount of a solvent medium consisting essentially of at least one normally liquid polyol having a molecular weight of at least about 500 and a hydroxyl number in the range of about 30 to about 600. Second, the monomer is polymerized in the polyol solvent by free radical addition polymerization to a substantially linear polymer having a molecular weight of at least 5,000 to provide a liquid, stable dispersion of polymer-polyol having a viscosity of less than 40,000 cps. at 10% polymer concentration.

Thus the polymer-polyols or graft-polyols are dispersions of a high molecular weight polymer having radicals reactive with isocyanato radicals and a reactive solvent which is a solvent or dispersing medium for the polymer, which medium also contains radicals reactive with isocyanato radicals.

Among the ethylenically unsaturated monomers which may be used to produce the polymer-polyols or graft-polyols are styrene, methyl methacrylate, acrylonitrile and vinyl acetate. Polymerizable monomers having at least one polymerizable ethylenic unsaturated group of the type C=C, and which can be used singly or in combination to produce the polymer-polyols or graft-polyols are well known in the art and include the hydrocarbon monomers, substituted styrenes, the acrylic and substituted acrylic monomers, the vinyl esters, vinyl ethers, vinyl ketones, etc. as set forth in U.S. Pat. No. 3,383,351.

The polyol reactive solvent is also described in U.S. Pat. No. 3,383,351 and examples of such polyols include hydroxyl-terminated polyesters, polyhydroxy alkanes, polyphenols, polyoxyalkylene polyols or the like having a molecular weight of about 500 and the corresponding mercapto derivatives. Numerous specific examples of the polyols are set forth in the patent.

U.S. Pat. No. 3,304,273 discloses a polymer-polyol mixture suitable for making a polyurethane wherein the essential components of the reactive mixture consist of a substantial but minor amount of polymer having a molecular weight of at least 5,000 and having a plurality of radicals containing active hydrogen atoms which are reactive with the -N-C-O radicals of an organic polyisocyanate. The aforesaid mixture also includes a major amount of solvent medium for the polymer. Such solvent medium consists essentially of at least one polyol having a molecular weight of at least about 500. The polymer is the polymerizate obtained by polymerizing an ethylenically unsaturated monomer to a molecular weight of at least 5000 and to a solid concentration of about 10% to about 50% by weight in the polyol.

U.S. Pat. No. 3,325,421 discloses a method of making a stable dispersion of a urea in an organic polyhydroxy compound having at least two alcoholic hydroxyl groups, a molecular weight of at least 500 and a hydroxyl number of not more than about 225. Examples of suitable organic polyhydroxy compounds having at least two alcoholic hydroxyl groups include hydroxyl polyesters, polyhydric polyalkylene ethers, polyhydric polythioethers, polyacetals, aliphatic polyols, including alkane, alkene and alkylene diols, triols, tetrols and the like. Specific compounds coming within these categories are disclosed in the patent.

U.S. Pat. No. 4,374,209 discloses a polymer-modified polyol formed by polymerizing an olamine, such as an alkanolamine, with an organic polyisocyanate in the presence of a polyol. The olamine reacts polyfunctionally with the polyisocyanate to produce polyaddition products constituting a stable dispersion in the polyol. Such polymer-modified polyol is useful for reaction with a polyisocyanate in the manufacture of polyurethane foam. An olamine/organic polyisocyanate molar ratio of 1.0/0.8 to 1.0/1.1 is preferred. Triethanolamine is a preferred olamine.

The polymer-polyol compositions described in U.S. Pat. No. 4,208,314 are also suitable for use in making the enhanced polyurethane foam cushioning materials of the present invention and the disclosure of this patent is incorporated herein by reference. The patent discloses making the fluid polymer-polyol composition from a reaction mixture containing 70 to 90 weight percent polyol having a hydroxyl number of from 20 to 150 and 10–30 weight percent of a monomer mixture of (a) from 33 to 75 weight percent of acrylonitrile or methacrylonitrile and (b) from 25 to 67 weight percent styrene or alpha-methyl styrene. The weight percent of the nitrile and the styrene or alpha-methyl styrene is based on the total weight of these materials. The fluid polymer polyol composition thus formed has the polymer consisting essentially of polymer particles having diameters less than one micron suspended in the polyol due to the polymerization taking place in the presence of a free radical catalyst at a temperature at which the half-life of a catalyst is no longer than six minutes. Applicant has found that for purposes of use in the formulation of the present invention the polymer can consist essentially of particles which do not exceed about 3 microns in diameter suspended in the polymer-polyol composition. In essence, the vinyl-type polymer polyols are prepared by polymerizing, via free radical initiators, vinyl monomers, such as acrylonitrile and styrene, in-situ in the high molecular weight base polyols. The vinyl polymer phase separates upon polymerization resulting in a polyol having lightly grafted minute particles of vinyl polymer.

Preferred polymer polyols for the purposes of the present invention are those having dispersed fine particle solids in the percentage range of 10–40% contained in base polyols.

The polyurethane foams are prepared in the usual known manner, using organic polyisocyanates, usually difunctional isocyanates, such as toluene diisocyanate (commercially a blend of 80% 2,4-toluene diisocyanate and 20% 2,6-toluene diisocyanate), which blend is the preferred polyisocyanate and is referred to as TDI in the industry. Examples of other usable difunctional isocyanates include 4,4-diphenylmethylene diisocyanate, polymethylene poly (phenyleneisocyanates) and their mixtures. A mixture of 80% of the aforementioned commercial toluene diisocyanate blend, TDI, and 20% of any of the aforementioned diphenyl methylene diisocyanates may also be used. The amount of isocyanate employed in making the foams of the invention should be sufficient to provide at least 0.9 NCO group per hydroxyl group present in the reactive system, which includes the polyol as well as any additive or foaming agent employed. While an excess of isocyanate can be employed, this is generally undesirable due to the high cost of the isocyanate. It is preferred to use sufficient isocyanate to provide between about 0.9 to about 1.25 NCO groups per hydroxyl group. The ratio of NCO to OH groups times 100 is referred to as the INDEX in the industry.

The blowing or foaming agents which may be used are any of those known to be useful for this purpose, and include water, trichloromonofluoromethane and methylene chloride. Other halogenated hydrocarbons and lower molecular weight alkanes, alkenes, ethers and mixtures thereof can also be used, although the ones named above are preferred. When water is used as the blowing agent, it reacts with the isocyanate to yield carbon dioxide which expands the volume of the foam as it is formed. The halogenated materials function as relatively inert low boiling ingredients which volatilize early during the foam reaction, thus greatly expanding the volume of the foam. The preferred amount of water is within the range of about 1–5 parts per hundred parts of the total polyol (php) and the preferred amount of methylene chloride is within the range of up to about 15 php of the total polyol.

Surfactants may be utilized to assist in cell size control and cell stabilization during the foaming process and are generally present in an amount of up to about 3 parts by weight per 100 parts by weight of the polyol. Among the operable surfactants are the block copolymers of polyalkylene oxides and polysiloxane. The most preferred surfactants are those termed HR (High Resiliency) surfactants and which are available commercially from companies such as Dow Corning Corporation, Union Carbide Corporation and Theodore Goldschmidt AG. Such compositions are described, for example, in U.S. Pat. No. 3,887,483 and the entire disclosure relating to the siloxane block copolymer surfactants disclosed therein is hereby incorporated into this application. Such surfactants of the patent have a molecular weight of from about 500 to about 2,500, a siloxane content from about 40 to about 70 weight percent based on the weight of the copolymer and an oxyethylene content of at least 35 percent based on the total amount of any oxyalkylene groups present in the copolymer.

Other ingredients which may be used in the foam formation process include amines and organometallic compounds which function in many ways, such as catalyzing the water/isocyanate reaction, or in assisting and regulating the stability of the foam during the foaming process. While many of such other ingredients may be and have been utilized in the known processes for making foam, optimized systems usually have employed a mixture of a tertiary amine, such as bis(2,2-dimethylaminoethyl) ether, 1,4-diazabicyclo [2.2.2] octane, and tin catalyst, such as dibutyltin dilaurate or bis(2-ethylhexyl) tin (stannous octoate). The additional amines function as catalysts and also function as reaction stabilizers. Functional amines such as diethanolamine, triethanolamine, and diisopropanolamine may also be used during foam formation process.

The polyurethane foams of the present invention are prepared in the presence of a catalytic amount of a reaction catalyst which catalyst may be any of the catalysts known to be useful for this purpose, such as tertiary amines and metallic salts, and particularly stannous salts and mixtures thereof. Such catalysts may be employed in any catalytic proportion, such as between about 0.1 to about 3 parts, and preferably between 0.2 to about 2.5 parts per 100 parts by weight of the polyol.

Depending on the end use of the polyurethane cushioning material, flame retardants may be utilized during the foam formation process. Preferred flame retardants include chlorinated phosphate esters and brominated aromatic compounds and compositions available commercially from Albright & Wilson, Inc., Ethyl Corporation, Great Lakes Chemical Corporation, Akzo Chemie America, and others. Cost effective flame retardants include the chlorinated phosphate esters and, when used, the amount of retardant present in the foam formation process is within the range of about 2 to about 10 php of the total polyol.

Various additives can also be used in the process to provide different properties, including fillers, such as barytes, dyes for color, plasticizers, deodorants, antioxidants and the like.

In preparing a foam of the present invention, the foam ingredients, with the exception of the isocyanate, are preblended in a reactor until a good mixture is obtained and the isocyanate is added thereto and mixed therewith. The mixing with the isocyanate causes initiation of the foam reaction accompanied by the evolution of carbon dioxide and the volatilization of the blowing agents and expansion of the volume of the foam. Within a short time period, usually within one to four minutes, the foam expansion is completed. However, the internal chemical reactions of the foam ingredients are usually not completed for days after the completion of foam expansion. It is believed that the expanded but yet uncured foam undergoes further reaction of the residual isocyanate and polyol to completely form the polyurethane network. During the time period after the foam expansion has been completed, but before any substantial curing has occurred, the foam is densified by compaction or crushing to yield the polyurethane foam of the present invention having a very large Support Factor and unexpectedly better cushioning properties than known densified polyurethane foams. While the time during which the compaction process may take place can be from a few seconds to several minutes after the foam expansion has been completed, the preferred process involves compaction of the foam within about one to about four minutes after the completion of such expansion. Sufficient compaction force is applied to reduce the volume of the partially cured cellular material by from about 10% to about 60% of its original volume. Thus a volume of partially cured cellular material having a height of 10 inches would have its height reduced by from about one to about six inches to form a final product having a height of from 4 to 9 inches, depending on the compaction force which was applied.

Samples of the polyurethane foam cushioning material of the present invention may be prepared by employing standard foaming equipment for the entire expansion portion of the foam process. Following a short cure time, the foam is passed through a two-belt pressure conveyor which gradually compresses the foam to the desired height and density. The preferred method of compaction is the use of a horizontal bottom conveyor along with an adjustable top conveyor as disclosed in the patents referred to supra.

The following examples are merely illustrative of the densified polyurethane foam cushioning material of the present invention and the process for making such materials, and the invention is not to be considered restricted thereto.

EXAMPLE 1

The following ingredients in the indicated amount were thoroughly mixed in a container equipped with a stirrer.

| Ingredient | Parts by Weight |
|---|---|
| Carpol Polyol GP-6500* | 60.70 |
| Niax Polyol 34-28** | 40.00 |
| Tri ($\beta,\beta$-dichloroisopropyl) phosphate | 3.00 |
| Diisopropanolamine | 1.70 |
| Triethanolamine-85%*** | 2.20 |
| Water | 3.30 |
| Silicone L-5306***** | 1.50 |
| Polycat 41**** | 0.24 |
| Catalyst****** | 0.10 |
| Stannous Octoate | 0.03 |
| Yellow Dispersion | 0.14 |

*A high molecular weight glycerine-initiated polyether polyol available from Carpenter Chemical Company.
**A stable dispersion of a poly (styrene-co-acrylonitrile) polymer in a polyether polyol available from Union Carbide Corporation.
***Mixture of 85% triethanolamine and 15% diethanolamine
****A tertiary amine catalyst available from Air Products Chemical Company.
*****A polysiloxane polyakylene oxide block copolymer available from Union Carbide Corporation.
******A 33% mixture of 1,4-diazabicyclo [2.2.2] octane in a glycol solvent 49.78 parts by weight of 80/20 toluene diisocyanate (TDI) were then added thereto and mixed and the mixture was poured into a container where full expansion and subsequent curing of the foam was permitted to occur.

The process of Example 1 was repeated except that about one minute after attaining full expansion, the uncured foam was compacted and compressed to raise its density concommittant with attainment of the greater Support Factor for Examples 2–4, as set forth in Table I.

TABLE I

| Physical and Combustibility Properties of Foams | | | | |
|---|---|---|---|---|
| | Examples | | | |
| Properties | 1 | 2 | 3 | 4 |
| Density (pcf) | 2.08 | 3.21 | 3.95 | 5.00 |
| Porosity | 40 | 20 | 15 | 20 |
| 25% IFD, lbs | 38.0 | 38.8 | 39.6 | 52.0 |
| 65% IFD, lbs | 73.4 | 158.8 | 198.7 | ND* (high) |
| 25% IFD, return, lbs | 29.3 | 30.4 | 29.1 | 40.4 |
| Support Factor | 1.93 | 4.09 | 5.02 | 4.0 |
| Hysteresis, % | 22.9 | 21.6 | 26.5 | 22.3 |

*Not Determined - too large for machine

From the foregoing, it is seen that the Support Factor for the foams of the invention of Examples 2–4 has more than doubled over that of Example 1.

Polyurethane foams were made from the ingredients set forth in Table II and identified as Examples 5–10. The identification of the ingredients is the same as in Example 1. Each of these foams was prepared on a conventional production flexible polyurethane foam machine where the ingredients were first mixed and then the diisocyanate added thereto and the the apparatus shown in U.S. Pat. No. 4,134,945. The elapsed time from foam preparation initiation to initiation of densification and the ratio of fully expanded foam height to densified foam height is also set forth in Table II. Each of the foams of the invention in Examples 5 to 10, inclusive, had an increased Support Factor.

TABLE II

| Ingredients | Examples | | | | | |
|---|---|---|---|---|---|---|
| | 5 | 6 | 7 | 8 | 9 | 10 |
| Carpol Polyol GP-6500 | 80.70 | 70.70 | 55.70 | 45.70 | 30.70 | 10.70 |
| Niax Polyol 34-28 | 20.00 | 30.00 | 45.00 | 55.00 | 70.00 | 90.00 |
| Water | 3.15 | 3.20 | 3.30 | 3.30 | 3.30 | 3.30 |
| Methylene Chloride | 3.50 | 1.50 | 0.00 | 0.00 | 0.00 | 0.00 |
| Silicone L-5306 | 2.00 | 1.50 | 1.50 | 1.50 | 1.50 | 1.50 |
| Catalyst | 0.05 | 0.05 | 0.05 | 0.05 | 0.05 | 0.05 |
| Diisopropanolamine | 1.70 | 1.70 | 1.70 | 1.70 | 1.70 | 1.70 |
| Triethanolamine-85% | 2.20 | 2.20 | 2.20 | 2.20 | 2.20 | 2.20 |
| Polycat 41 | 0.24 | 0.24 | 0.24 | 0.24 | 0.24 | 0.24 |
| Stannous Octoate | 0.03 | 0.03 | 0.03 | 0.03 | 0.03 | 0.03 |
| Tri ($\beta,\beta$-dichloro-isopropyl) phosphate | 3.00 | 3.00 | 3.00 | 3.00 | 3.00 | 3.00 |
| Yellow Dispersion | 0.14 | 0.14 | 0.14 | 0.14 | 0.14 | 0.14 |
| TDI | 45.5 | 46.8 | 48.7 | 49.6 | 50.5 | 50.5 |
| TDI Index | 107 | 109 | 111 | 113 | 115 | 115 |
| Densification time, sec* | 188 | 188 | 188 | 188 | 188 | 188 |
| Compaction Factor** | 1.22 | 1.22 | 1.22 | 1.22 | 1.22 | 1.22 |
| 25% IFD, min | 11 | 16 | 21 | 26 | 31 | 41 |
| Support Factor | 3.25 | 3.25 | 3.5 | 3.5 | 3.5 | 3.5 |

*Elapsed time from foam preparation initiation to initiation of densification.
**Ratio of fully expanded foam height to densified foam height at the closest approach of the two-belt conveyor.

Foams were prepared in the usual manner from the ingredients listed in Table III, using standard foam machinery. The identification of the ingredients is the same as in Example 1. The foam of Example 11 was not subject to any compaction while the foams of Examples 12 and 13 were subjected to the different levels of compaction. The Support Factor for a specific foam can be controlled by controlling the amount of compaction to which the foam is subjected. Thus, as the Compaction Factor increases from 1.20 to 1.45 in Examples 12 and 13, the Support Factor increased from 3.46 to 3.97.

TABLE III

| Ingredients | Examples | | |
|---|---|---|---|
| | 11 | 12 | 13 |
| Carpol Polyol GP-6500 | 75.51 | 75.51 | 75.51 |
| Niax Polyol 34-28 | 25.00 | 25.00 | 25.00 |
| Water | 3.20 | 3.20 | 3.20 |
| Trichloromonofluoro-methane | 1.50 | 1.50 | 1.50 |
| Silicone L-5306 | 1.50 | 1.50 | 1.50 |
| Catalyst | 0.05 | 0.05 | 0.05 |
| Diisopropanolamine | 1.70 | 1.70 | 1.70 |
| Triethanolamine-85% | 2.20 | 2.20 | 2.20 |
| Polycat 41 | 0.24 | 0.24 | 0.24 |
| Stannous Octoate | 0.03 | 0.03 | 0.03 |
| Tetrakis(2-chloroethyl) ethylene diphosphate | 3.00 | 3.00 | 3.00 |
| Yellow Dispersion | 0.28 | 0.28 | 0.28 |
| TDI | 46.5 | 46.5 | 46.5 |
| TDI Index | 108 | 108 | 108 |
| Compaction Factor | none | 1.20 | 1.45 |
| Density, pcf | 1.80 | 1.97 | 2.25 |
| 25%, IFD, lbs | 17.2 | 14.2 | 15.6 |
| 65%, IFD, lbs | 41.6 | 49.2 | 62.0 |
| Support Factor | 2.42 | 3.46 | 3.97 |

Examples 14–16 show the use of alternate polymer polypols to form the densified polyurethane foam cushioning of the invention and Table IV sets forth the properties of the foams of the non-densified foams of Example 14 and 15 as compared to the densified foam of the invention in Example 16. Again, the identification of the ingredients is the same as in Example 1.

TABLE IV

| Ingredients | Examples | | |
|---|---|---|---|
| | 14 | 15 | 16 |
| Carpol Polyol GP-6500 | 50.61 | 50.61 | 50.61 |
| Niax Polyol 34-28 | 50.00 | — | — |
| Multranol Polyol E-9225* | — | 50.00 | 50.00 |
| Water | 1.89 | 1.89 | 1.89 |
| Silicone L-5306 | 1.00 | 1.00 | 1.00 |
| Catalyst | 0.25 | 0.25 | 0.25 |
| Polycat 41 | 0.22 | 0.22 | 0.22 |
| Diisopropanolamine | 2.75 | 2.75 | 2.75 |
| Triethanolamine-85% | 3.00 | 3.00 | 3.00 |
| Yellow Dispersion | 0.14 | 0.14 | 0.14 |
| Tri-($\beta,\beta$-dichloro-isopropyl) phosphate | 3.00 | 3.00 | 3.00 |
| Trichloromonofluoromethane | 3.60 | 3.60 | 3.60 |
| Stannous Octoate | 0.03 | 0.03 | 0.03 |
| TDI | 39.5 | 39.5 | 39.5 |
| TDI Index | 107 | 107 | 107 |
| Densified | NO | NO | YES |
| Density, pcf | 2.26 | 2.28 | 4.52 |
| Density ratio | — | — | 1.98 |
| 25% IFD, lbs | 23.2 | 15.4 | 17.1 |
| 65% IFD, lbs | 51.2 | 37.2 | 116.5 |
| Support Factor | 2.21 | 2.42 | 6.81 |

*A high molecular weight polyether polyol containing a polyurea dispersion available from Mobay Chemical Company.

The densified foams of the present invention have been fabricated into mattresses, furniture cushions and automotive cushions. Persons evaluating the comfort of these constructions have described them as having a unique and superior feeling of comfort resulting from a soft touch yet with a deep firm support with appropriate springiness to the foam as compared to conventional polyurethane foams, conventional densified foams and high resiliency foams. The densified foams of the present invention have a polymer particle content of about 5 to about 20% by weight of the polyols.

We claim:

1. In the method for preparing a flexible, densified polyurethane foam which comprises, (a) placing a polyol polyurethane foam-forming reaction mixture in a reaction zone and allowing the mixture to rise, thereby forming a partially cured cellular material, (b) applying a compressive force to the partially cured cellular material after the elapsing of a period of time after completion of the rise to thereby reduce the volume of the partially cured cellular material, and (c) remvoing the compressive force and completing the cure of the compressed cellular material, the improvement wherein said compressed, densified cellular material has enhanced cushioning properties including a unique and superior feeling of comfort resulting from a soft touch yet with a deep firm support with an appropriate springiness to the foam, said improvement consisting essentially of having said polyol in said polyurethane foam-forming reaction mixture consisting essentially of a mixture of (d) from 90–10 parts by weight of a polymer-polyol composition containing about 10–40% poymer solids, and (e) from 10–90 parts by weight of a base polyol having a molecular weight of at least 4500 up to 7000, said densified cellular material having enhanced cushioning properties and having a final volume which is reduced by about 10–60% of the original volume of the partially cured cellular material after said compressive force is removed and containing about 5 to about 20 percent polymer particles based on the weight of the polyol components of said polyurethane foam-forming reaction mixture, said densified cellular material having enhanced cushioning properties also having a Support Factor of from about 2-5.

2. The process as defined in claim 2 wherein said base polyol has a molecular weight of 5000-7000 and has a plurality of its primary hydroxyl end groups capped with ethylene oxide.

3. The process as defined in claims 1 or 2 wherein said polymer-polyol compositions containing about 10-40% solids is present in an amount of from about 70-30 parts by weight and said base polyol is present in an amount of from about 30-70 parts by weight.

4. The process as defined in claims 1 or 2 wherein said polymer-polyol composition containing about 10-40% polymer solids is present in an amount of from about 60-40 parts by weight and said base polyol is present in an amount of from about 40-60 parts by weight.

5. The process as defined in claims 1 or 2 wherein said compressive force is applied to the partially cured cellular material within a period of about one to about four minutes after the completion of the rise of the foam.

6. The improved densified cellular polyurethane foam material having enhanced cushioning properties including a unique and superior feeling of comfort resulting from a soft touch yet with a deep firm support with an appropriate springiness in the foam material made in accordance with the process of claims 1, or 2.

7. An improved, densified cellular polyurethane foam material having enhanced cushioning properties characterized by a unique and superior feeling of comfort resulting from a soft touch yet with a deep firm support with an appropriate springiness in the foam material, said foam material having a Support Factor of about 2 to 5 or more, said improved densified cellular polyurethane from material prepared by the process which comprises (a) placing into a reactor a polyurethane foam-forming reaction mixture comprising
   (i) from 90-10 parts by weight of a polymerpolyol composition containing about 10-40% polymer solids,
   (ii) from 10-90 parts by weight of a base polyol having a molecular weight of at least 4500 up to about 7000,
   (iii) an organic polyisocyanate, a foaming agent and a catalyst capable of forming a polyurethane foam and allowing the mixture to rise freely, thereby forming a partially cured cellular material, (b) applying a compressive force to the partially cured cellular material about one to about four minutes after completion of the rise;

(c) removing the compressive force and completing the cure of the compressed cellular material, said compressed cellular material having a polymer solids content of about 5 to about 20 percent based on the weight of the polyol components of the foam-forming reaction mixture.

8. The improved, densified cellular polyurethane foam material having enhanced cushioning properties as defined in claim 7 wherein said base polyol has a molecular weight of 5000-7000 and has a plurality of its primary hydroxyl end groups capped with ethylene oxide.

9. The improved, densified cellular polyurethane foam material having enhanced cushioning properties as defined in claim 7 wherein said polymer-polyol composition is a poly (styrene-co-acrylonitrile) polymer in a polyether polyol.

10. The improved, densified cellular polyurethane foam material having enhanced cushioning properties as defined in claim 7, wherein said polymer polyol composition is a polyureapolyether polyol dispersion.

11. The improved, densified cellular polyurethane foam material having enhanced cushioning properties as defined in claims 7, 8, 9 or 10 wherein said base polyol is the reaction product of propylene oxide and glycerol in the presence of a catalytic amount of potassium hydroxide catalyst.

12. The improved densified cellular polyurethane foam material having enhanced cushioning properties including a unique and superior feeling of comfort resulting from a soft touch yet with a deep firm support with an appropriate springiness in the foam material made in accordance with the process of claim 3.

13. The improved densified cellular polyurethane foam material having enhanced cushioning properties including a unique and superior feeling of comfort resulting from a soft touch yet with a deep firm support with an appropriate springiness in the foam material made in accordance with the process of claim 4.

14. The improved densified cellular polyurethane foam material having enhanced cushioning properties including a unique and superior feeling of comfort resulting from a soft touch yet with a deep firm support with an appropriate springiness in the foam material made in accordance with the process of claim 5.

* * * * *